United States Patent Office 3,535,258
Patented Oct. 20, 1970

---

3,535,258
MACHINE DISHWASHING COMPOSITION AND PROCESS
Philip M. Sabatelli, Cincinnati, Ohio, and Charles A. Brungs, Fort Wright, Ky., assignors to W. R. Grace & Co., New York, N.Y., a corporation of Connecticut
No Drawing. Filed Dec. 4, 1967, Ser. No. 687,441
Int. Cl. C11d 7/54
U.S. Cl. 252—105                4 Claims

---

ABSTRACT OF THE DISCLOSURE

Food soils are washed from cooking and eating utensils with a low foaming aqueous solution of a washing composition comprising from 10 to 50 parts alkali metal hydroxide, 5 to 30 parts tetra-alkali metal pyrophosphate, 5 to 30 parts alkali metal tripolyphosphate, 0.1 to 5 parts of a water-soluble polyacrylate, and 0.1 to 5 parts alkali metal nitrite. With this composition, particularly in dishwashing machines, food soils are more efficiently removed from cooking and eating utensils with less spotting and greater clarity to glassware and dishes.

---

This invention relates to a dishwashing composition which more effectively removes food soils from glassware, dishes and the like with less spotting and greater clarity, and to washing processes using this composition.

In summary, the machine dishwashing composition of this invention comprises from 10 to 50 parts by weight of an alkali metal hydroxide, from 5 to 30 parts by weight of a tetraalkali metal pyrophosphate, from 5 to 30 parts by weight of an alkali metal tripolyphosphate, from 0.1 to 5 parts by weight of a water-soluble polymer having a molecular weight of from 1000 to 15,000,000 and having repeated groups with the formula

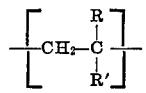

wherein R is hydrogen or a methyl group and R' is an amide or carboxylate group, and from 0.1 to 5 parts by weight water-soluble nitrite. The composition can contain up to 99 parts by weight water or it can be packaged as a dry solid. In summary, the process of this invention for washing dishes and other eating and cooking utensils comprises the steps of applying an aqueous solution of 0.05 to 1 weight percent of this dishwashing composition (based on the weight of the dry solid components thereof) and having a temperature of 140 to 200° F. (preferably 140 to 160° F.) to the surface of the articles being cleaned, preferably by spraying and rinsing the articles.

Institutional and household dishwashing machines use strongly alkaline solutions for washing dishware, glasses, and other cooking and eating utensils. Ordinary tap water is customarily used with the cleaning composition to form the cleaning solution and for rinsing purposes. As is well known in using such a washing process, spotting by inorganic salt residues and precipitates on the dishes and glassware is a major problem. Deposit formation also interferes with the operation of the washing equipment, requiring frequent maintenance. Condensed phosphates have been used in these cleaning compositions, but at elevated solution temperatures, rapid hydrolysis and the formation of orthophosphate precipitates occur. Because of the highly alkaline conditions existing in the cleaning solutions, organic compounds have not been generally found suitable to eliminate spotting; they either have no activity or interfere with the cleaning operation. Organic compounds which would inhibit spotting by inorganic salt residues were generally found to function as foaming agents in conjunction with the cleaning agents and food residues under the highly alkaline conditions in the wash solution, making them inoperable in dishwashing machines.

Use of various polyelectrolytes in conjunction with organic detergents has been disclosed in British Pats. 451,342 and 1,073,947 and in U.S. Pat. 3,308,067. However, in these systems polyelectrolytes were used in conjunction with organic soaps and detergents in substantially neutral systems where foaming is desirable. These patents do not relate to highly alkaline, low foaming systems.

It is an object of this invention to provide a superior machine dishwashing composition which more effectively removes food soils and residues from eating and cooking utensils such as dishes, glassware and the like with decreased spotting and greater clarity of the glassware and dishes. It is another object of this invention to provide a method for more effectively cleaning dishes, glassware, and other eating and cooking utensils with decreased spotting by salt residues.

All concentrations are herein given as parts by weight or weight percents unless otherwise specified.

In general, the machine dishwashing composition of this invention is a mixture of the following ingredients:

|  | Parts by weight | |
| --- | --- | --- |
|  | Operable | Preferred |
| Alkali metal hydroxide | 10–50 | 10–20 |
| Pyrophosphate | 5–30 | 10–20 |
| Tripolyphosphate | 5–30 | 10–20 |
| Polyacrylate | 0.1–5 | 0.1–1 |
| Nitrite | 0.1–2 | 0.1–0.5 |
| Water | 0–99 | 20–80 |

The alkali metal hydroxide can be sodium hydroxide, potassium hydroxide, or mixtures thereof. Milder alkaline materials such as sodium or potassium carbonate, or sodium or potassium orthophosphates can be substituted to a limited extent for some of the hydroxide. For example, 0 to 20 weight percent of the alkali metal hydroxide can be replaced with orthophosphate or carbonate or mixtures of these materials. Preferably, however, potassium hydroxide is used as the alkaline component.

Two condensed phosphates are preferably used in the composition of this invention. As pyrophosphates, any alkaline metal pyrophosphate such as sodium or potassium pyrophosphate can be used. Alkali metal tripolyphosphate such as sodium and potassium tripolyphosphates are suitable. The preferred condensed phosphates are sodium tripolyphosphate and tetrapotassium pyrophosphate.

The polyacrylate component in the composition comprises a water-soluble organic polymer having a molecular weight of from 1000 to 15,000,000 and having repeated groups with the formula

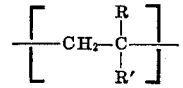

wherein R is hydrogen or a methyl group and R' is an amide or carboxyl group and salts thereof.

Particularly suitable polyelectrolytic polymers for use in this invention are the polymers of acrylic or methacrylic acid derivatives, for example, acrylic acid, the alkali metal and ammonium salts of acrylic acid, methacrylic acid, the alkali metal and ammonium salts of methacrylic acid, acrylamide, methacrylamide, the N-alkyl substituted amides, the N-aminoalkylamides, and the corresponding N-alkylaminoalkyl substituted amides, the aminoalkyl acrylates, the aminoalkyl methacrylamides, and the N-alkyl substituted aminoalkyl esters of either acrylic or methacrylic acids. These polymeric compositions may be homopolymers or they may be copolymers with other copolymerizing monomers, such as ethylene, propylene, isobutylene, styrene, a-methylstyrene, vinyl acetate, vinyl formate, alkyl ether, acrylonitrile, methacrylonitrile, vinyl chloride, vinylidene chloride, the alkyl acrylates, the alkyl methacrylates, the alkyl maleates, and the alkyl fumarates, and other olefinic monomers copolymerizable therewith. The copolymers of this type, having at least 50 mole percent of the acrylic or methacrylic acid derivatives, are preferred, and especially when the comonomer is hydrophobic or has no ionizable groups. Polymers of this type may be prepared directly by the polymerization of suitable monomers, or by the after-chemical reaction of other polymers, for example by the hydrolysis of acrylonitrile or methacrylonitrile polymers.

In connection with the various types of polyelectrolytic polymers suitable for the practice of this invention, the hydrophilic polymer may be prepared directly by the polymerization of one or more of the various available organic monomers with aliphatic unsaturation, if the said compounds contain a hydrophilic group, for example, carboxyl groups. Generally, more types of polyelectrolyte polymers can be prepared by subsequent reactions of polymers and copolymers. For example, polymers containing nitrile groups may be hydrolyzed to form water-soluble amide and carboxy containing polymers or hydrogenated to form amine-containing polymers. Similarly, copolymers of maleic anhydride and vinyl acetate may be hydrolyzed to form polymers containing hydrophilic lactone rings. Other hydrophilic polymers can be prepared by the hydrolysis of copolymers of vinyl acetate wherein the acetyl groups are removed leaving hydroxy groups which promote the solubilization effect of polyelectrolytic groups present. By other reactions non-hydrophilic polymers may be converted into lactam or amide containing polymers which are more hydrophilic. Polyvinyl alcohol, not in itself a polyelectrolyte, may be converted into polyelectrolyte by esterification with dibasic acids, one of said carboxylic acid groups reacting with the alcohol radical and the other providing the hydrophilic characteristics by a carboxy group on the side chain. Still other types of polymers may be prepared by reacting halogen containing polymers, for example, the polymers or copolymers of vinyl chloroacetate or vinyl chloroethyl ether, with amines to form amine salt radicals and quaternary ammonium radicals whereby hydrophilic characteristics are introduced into what otherwise would be an insoluble polymer. Other soluble polymers can be prepared by the amonolysis of ketone containing polymers, for example, polyvinyl methyl ketone. Similarly active halogen atoms may be reacted with bisulfite to substitute sulfonic acid groups for the reactive halogens.

Thus, the various polyelectrolytes of the types described above are ethylenic polymers having numerous side chains distributed along a substantially linear continuous carbon atom molecule. The side chains may be hydrocarbon groups, carboxylic acid groups or derivatives thereof, sulfonic acid groups or derivatives thereof, phosphoric acid or derivatives thereof, heterocyclic nitrogen groups, aminoalkyl groups, alkoxy radicals and other organic groups, the number of which groups and the relative proportions of hydrophilic and hydrophobic groups being such as to provide a water-soluble polymeric compound having a substantially large number of ionizable radicals. The length of the said continuous carbon chain must be such as to provide compounds having a weight average molecular weight of at least 1,000.

Among the various polymers as described above and water-soluble salts thereof useful in the practice of the present invention, there may be mentioned hydrolyzed polyacrylonitrile and polyacrylamide, sulfonated polystyrene, acrylamide-acrylic acid copolymers, polyacrylic acid, ½ calcium salt of hydrolyzed 1:1 copolymer of vinyl acetate-maleic anhydride, hydrolyzed styrene-maleic anhydride copolymer, ammonium polyacrylate, sodium polyacrylate, ammonium polymethacrylate, sodium polymethacrylate, diethanolammonium polyacrylate, guanidinium polyacrylate, dimethyl-aminoethyl polymethacrylate, acrylamide-acrylonitrile copolymer, methacrylic acid-dimethylaminoethyl methacrylate copolymer, sodium polyacrylate-vinyl alcohol copolymer, hydrolyzed methacrylic acid-acrylonitrile copolymer, vinyl acetatemaleic anhydride copolymer, vinyl formate-maleic anhydride copolymer, vinyl methyl ether-maleic anhydride copolymer, isobutylene-maleic anhydride copolymer, styrene-maleic anhydride copolymer, ethyl acrylate-maleic anhydride copolymer, vinyl chloride-maleic anhydride copolymer, hydrolyzed acrylonitrile vinyl acetate copolymer, hydrolyzed acrylonitrile-methacrylonitrile copolymer hydrolyzed acrylonitrile-methacrylonitrile-vinyl acetate terpolymer, hydrolyzed acrylonitrile-methacrylic acid copolymer, vinyl pyridine-acrylonitrile copolymer, etc. Polymers containing cationactive groups also are useful. Suitable compounds are, for example, ethyl acrylate and acrylamidopropyl-benzyldimethyl-ammonium chloride, copolymers of methyoacrylamide and acrylamidopropylbenzyl-dimethylammonium chloride, copolymers of butadiene and 2-vinyl pyridine, and certain quaternary compounds such as polydimethylaminostyrene quaternized with benzyl chloride, allyl chloride, etc. and quaternized copolymers of vinyl alcohol and morpholinylethylvinylether and the like.

The preferred polymers are polyacrylic acid, polymethacrylic acid, polyacrylamide, polymethacrylamide, hydrolysis products of the polyamides, or water-soluble salts thereof having a molecular weight of from 1,000 to 200,000, calculated as polyacrylic acid.

The nitrites which can be used in the composition of this invention include any water-soluble nitrite salt such as alkali metal nitrites including sodium, potassium, and lithium nitrite, alkaline earth nitrites including calcium and magnesium nitrite, ammonium nitrite and the like. The preferred nitrite is sodium nitrite.

The composition of this invention can be stored and used as either a dry mixture of the above ingredients or a concentrated solution of the above ingredients with from 20 to 80 percent water. Preferably, liquid concentrates of this dish-washing composition contain from 40 to 80 percent water.

The preferred machine dishwashing composition of this invention is shown below:

| | Weight percent |
|---|---|
| Potassium hydroxide | 10–30 |
| Tetrapotassium pyrophosphate | 10–20 |
| Sodium tripolyphosphate | 10–20 |
| Polyacrylate | 0.1–5 |
| Sodium nitrite | 0.1–2 |
| Water | 20–80 |

In the process of this invention, an aqueous solution containing from 0.05 to 1 and preferably from 0.05 to 5 weight percent of the above dishwashing composition and having a temperature of from 140 to 200° F. and preferably from 140 to 160° F. is applied to the surfaces to be cleaned. Although any technique can be used for applying the aqueous solution of the dishwashing composition to the fouled surfaces, it is specifically designed for and is highly effective when used with spray washing equipment of the type conventionally used in cleaning cooking and eating utensils. Highly effective cleaning with low foaming is obtained in institutional dishwashing machines with this composition. In the final step of the cleaning process, the cleaned surfaces are preferably rinsed with water.

The unique alkaline dishwashing composition of this invention is highly effective to remove food soils and residues from dishes, glassware, and other cooking and eating utensils in conventional dishwashing machines. Not only are the food residues more effectively removed with this composition, but the cleaned dishes and glassware exhibit less spotting and greater clarity than with conventional cleaning compositions.

This invention is further illustrated by the following specific but non-limiting examples.

EXAMPLE 1

This example shows the improved results obtained with a machine dishwashing composition containing sodium polyacrylate, compared with the same composition without the polyacrylate. The washing compositions used in this test are as follows:

|  | Concentration, wt. percent | |
|---|---|---|
|  | Control | Sample 1 |
| Potassium hydroxide | 15 | 15 |
| Tetrapotassium pyrophosphate | 15 | 15 |
| Sodium tripolyphosphate | 15 | 15 |
| Sodium polyacrylate [1] |  | 2 |
| Sodium nitrite | 0.3 | 0.3 |
| Water | 54.7 | 52.7 |

[1] Average molecular weight, 1,000.

Squares of plate glass four inches on each edge were soiled with one gram of a soil containing 50 parts peanut butter, 25 parts hydrogenated vegetable oil, and 25 parts butter. A Hobart A.M. dishwashing machine was used for the test, the machine having a 48 second wash cycle and a 12 second rinse cycle. No rinse additive was used. The wash water contained 0.3 percent of the dishwashing composition and had a temperature of 150° F. in the wash section. The rinse water had a temperature of 180° F. The water used was Cincinnati tap water having a hardness of 192.5 p.p.m. In the test a set of 10 plates of glass were run through 8 cycles in the machine with a drying period of 15 minutes allowed between cycles.

Comparing plates cleaned with the Control and Sample 1 compositions, the plates tested with the composition of this invention (Sample 1) were clearer and less streaked in appearance, and the unspotted areas were brighter than on the plates washed with the Control. Spot counts on plates washed for 8 cycles were made; the number of spots represents the number of spots on both sides of one square inch of the center of each plate. The results of the spot counts are shown below:

| Plate No. | Sample 1 | Control |
|---|---|---|
| 1 | 30 | 51 |
| 2 | 59 | 65 |
| 3 | 31 | 63 |
| 4 | 28 | 67 |
| 5 | 23 | 60 |
| 6 | 22 | 57 |
| 7 | 49 | 70 |
| 8 | 51 | 68 |
| 9 | 54 | 80 |
| 10 | 54 | 60 |
| Total | 401 | 642 |
| Average | 40.1 | 64.2 |

A single plate tested with each compound through a one cycle wash exhibited 78 spots with the Control composition and 19 spots with Sample 1.

As shown in the example, the unique dishwashing composition of this invention not only more effectively eliminates food soils and the like from eating and cooking utensils, but also reduces the calcium and magnesium phosphate and carbonate deposits on the articles being cleaned and in the dishwashing machine.

Obviously, many modifications and variations of the invention as hereinabove set forth can be made without departing from the essence and scope thereof, and only such limitations should be applied as are indicated in the claims.

The invention claimed is:

1. A low-foaming dishwashing composition consisting essentially of:
  (a) from 10 to 50 parts by weight of an alkali metal hydroxide;
  (b) from 5 to 30 parts by weight of an alkali metal pyrophosphate;
  (c) from 5 to 30 parts by weight of an alkali metal tripolyphosphate;
  (d) from 0.1 to 5 parts by weight of a water-soluble polymer having a molecular weight of from 1000 to 15,000,000 and selected from the group consisting of hydrolyzed polyacrylonitrile and polyacrylamide, sulfonated polystyrene, acrylamide - acrylic acid copolymers, polyacrylic acid, ½ calcium salt of hydrolyzed 1:1 copolymer of vinyl acetate-maleic anhydride, hydrolyzed styrene-maleic anhydride copolymer, ammonium polyacrylate, sodium polyacrylate, ammonium polymethacrylate, sodium polymethacrylate, diethanolammonium polyacrylate, guanidinium polyacrylate, dimethyl-aminoethyl polymethacrylate, acrylamide - acrylonitrile copolymer, methacrylic acid - dimethylaminoethyl methacrylate copolymer, sodium polyacrylatevinyl alcohol copolymer, hydrolyzed methacrylic acid-acrylonitrile copolymer, vinyl acetate-maleic anhydride copolymer, vinyl formate-maleic anhydride copolymer, vinyl methyl ether-maleic anhydride copolymer, isobutylene-maleic anhydride copolymer, styrene-maleic anhydride copolymer, ethyl acrylate-maleic anhydride copolymer, vinyl chloride-maleic anhydride copolymer, hydrolyzed acrylonitrile-vinyl acetate copolymer, hydrolyzed acrylonitrile-methacrylonitrile copolymer, hydrolyzed acrylonitrile-methacrylonitrile-vinyl acetate terpolymer, hydrolyzed acrylonitrile-methacrylic acid copolymer, vinyl pyridine-acrylonitrile copolymer, ethyl acrylate and acrylamidopropyl-benzyldimethyl-ammonium chloride, copolymers of methylacrylamide and acrylamidopropyl-benzyl-dimethylammonnium chloride, copolymers of butadiene and 2-vinyl pyridine, polydimethylaminostyrene quaternized with benzyl chloride, allyl chloride, and quaternized copolymers of vinyl alcohol and morpholinylethylvinyl ether;
  (e) from 0.1 to 2 parts by weight of a water-soluble nitrite; and
  (f) from 0 to 99 parts by weight water.

2. The dishwashing composition of claim 1 wherein the water-soluble polymer is polyacrylic acid, polymethacrylic acid; polyacrylamide, polymethacrylamide, or the hydrolysis products of said polyamides; or water-soluble salts thereof; all having a molecular weight of from 1,000 to 200,000, calculated as polyacrylic acid.

3. The composition of claim 1 wherein the dishwashing composition consists essentially of:
  (a) from 10 to 20 parts by weight of the alkali metal hydroxide;
  (b) from 10 to 20 parts by weight of the alkali metal pyrophosphate;
  (c) from 10 to 20 parts by weight of the alkali metal tripolyphosphate;
  (d) from 0.1 to 1.0 part by weight of the water-soluble polymer;
  (e) from 0.1 to 0.5 part by weight of the water-soluble nitrite; and
  (f) from 20 to 80 parts by weight water.

4. The composition of claim 1 consisting essentially of:

(a) from 10 to 30 parts by weight potassium hydroxide;
(b) from 10 to 20 parts by weight tetrapotassium pyrophosphate;
(c) from 10 to 20 parts by weight sodium tripolyphosphate;
(d) from 0.1 to 5 parts by weight of a water-soluble polymer selected from the group consisting of polyacrylic acid, polymethacrylic acid, polyacrylamide, polymethacrylamide, hydrolyzed polyacrylamide, hydrolyzed polymethacrylamide, and water - soluble salts thereof;
(e) from 0.1 to 2 parts by weight sodium nitrite; and
(f) from 20 to 80 parts by weight water.

References Cited
UNITED STATES PATENTS

| | | | |
|---|---|---|---|
| 3,308,067 | 3/1967 | Diehl | 252—161 |
| 3,393,153 | 7/1968 | Zimmerer et al. | 252—95 |

MAYER WEINBLATT, Primary Examiner

U.S. Cl. X.R.

252—103, 152, 186